Oct. 9, 1973  R. O. NEFF ET AL  3,764,425

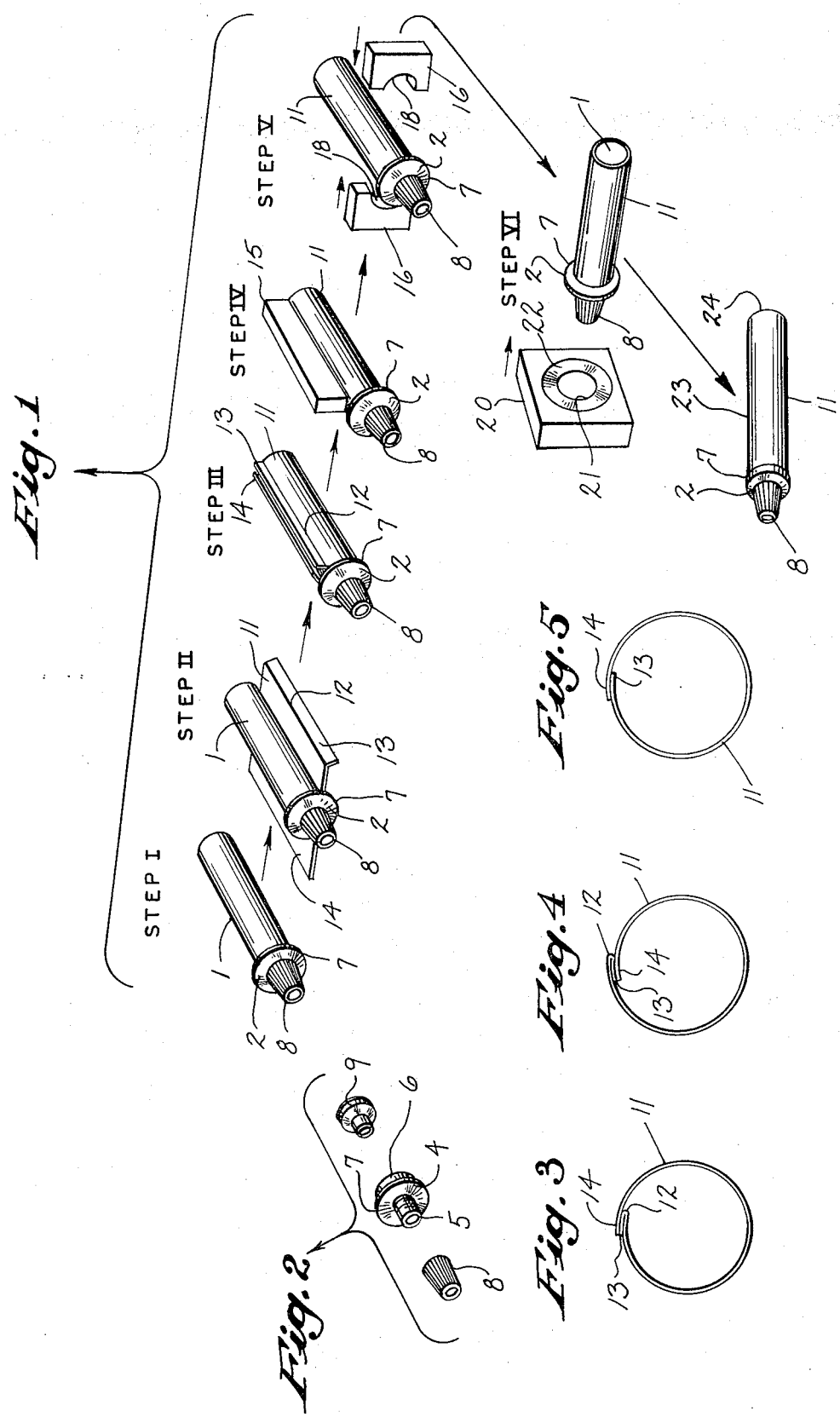

APPARATUS AND METHOD FOR THE MANUFACTURE OF TUBULAR CONTAINERS

Filed Jan. 10, 1972  4 Sheets-Sheet 2

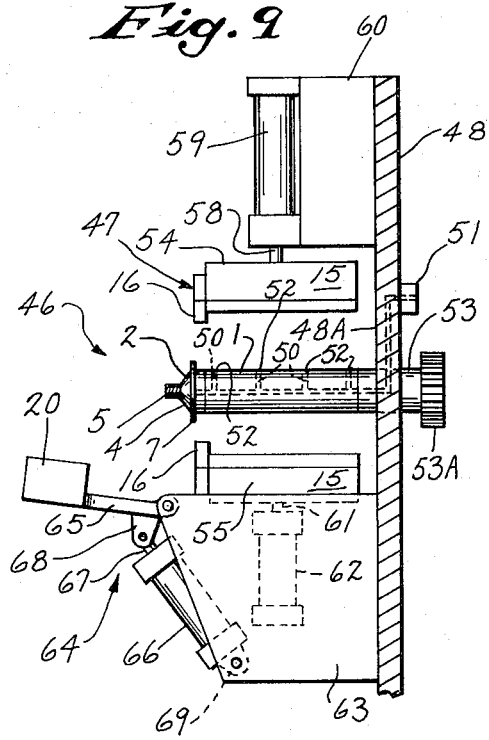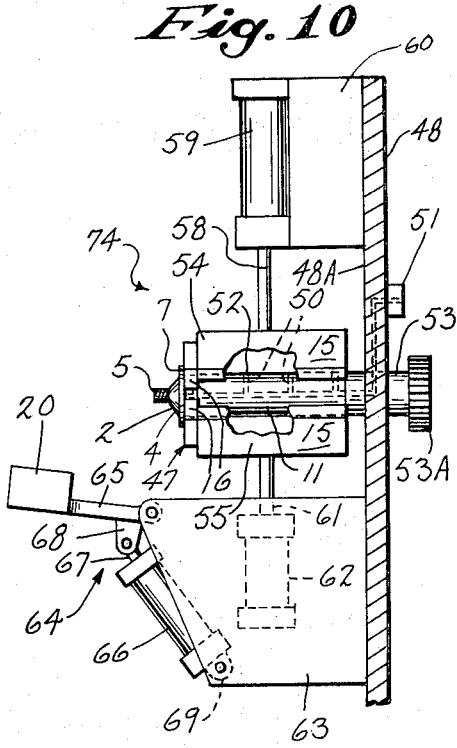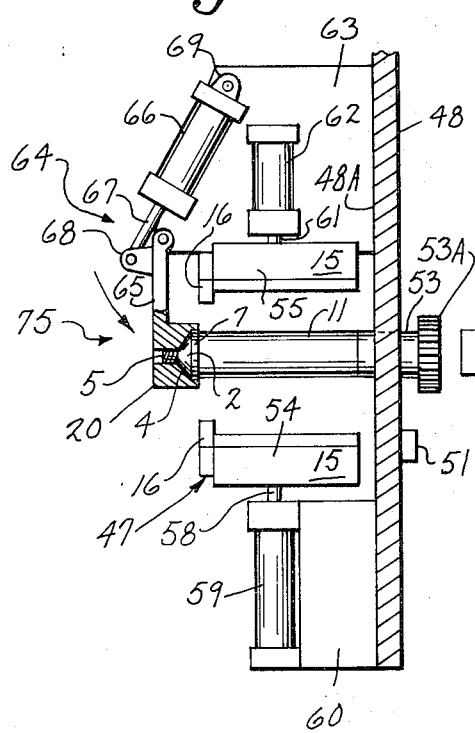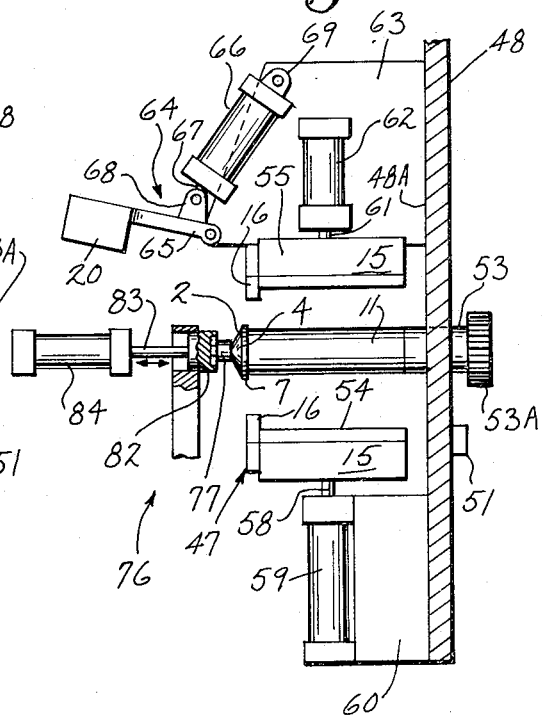

United States Patent Office  3,764,425
Patented Oct. 9, 1973

3,764,425
APPARATUS AND METHOD FOR THE MANUFACTURE OF TUBULAR CONTAINERS
Robert O. Neff, Milwaukee, Kenneth V. Morrison, Brookfield, and William D. Groechel, Whitefish Bay, Wis., assignors to Milprint, Inc., Milwaukee, Wis.
Filed Jan. 10, 1972, Ser. No. 216,502
Int. Cl. B29c 27/02
U.S. Cl. 156—69        12 Claims

ABSTRACT OF THE DISCLOSURE

Apparatus and methods for the manufacture of tubular containers of the type comprising a tubular body of flexible packaging material joined to an end closure member wherein the end closure member is first supported on a mandrel, a flat sheet of the body material is fed to the mandrel and folded into a tube around the end closure member and thereafter joined thereto to form a completed container. As a further feature, the apparatus may include means for thermally reflowing a portion of the end closure member if it is of a construction which includes a radially-extending flange that is thermally reflowable to the final position in which it is disposed axially of the container body.

BACKGROUND OF THE INVENTION

(1) Field

The field of this invention is the manufacture of collapsible tubular containers having a body made of a tube of heat sealable flexible packaging material with a closure member joined at one end of the tube body.

(2) Prior art

Several machines and methods are presently known for the manufacture of containers having a tubular body and some type of end closure member.

For example, U.S. Pat. 2,725,001 discloses a machine in which a sheet of material is fed to a mandrel and wrapped into a tube with an end of the tube projecting beyond the end of the mandrel, following which end closures are placed in position and joined to the tube. In 3,092,943 a web of body material is formed into a tube, portions of the tube are cut off and fed to a mandrel, and cap members are supplied to the mandrel and joined to the tube. Another version is shown in 3,111,063, according to which end caps are formed at the end of a mandrel, and then a tubular body is supplied to the mandrel and joined to the cap member. Other patents which show machines wherein sections of tubing are fed to mandrels, and caps are formed and then joined to the tubing include 2,661,790, 2,788,834 and 3,405,505.

The prior art machinery and methods discussed in the preceding paragraph exhibit several disadvantages. Those machines in which a sheet of material is formed into a tube on a mandrel and the cap added thereafter, as in 2,725,001, require accurate registration of the cap member and a projecting edge portion of the tube body. Machines as in 3,111,063 require the accurate fitting of a tube onto a mandrel which already carries a cap, and the machines typified in the other patents involve the problem of feeding the tube onto a mandrel and then joining a cap member to the tube while it is on the mandrel. Each of these techniques can cause problems brought about by the need to obtain registration between the cap and the tube body, and our present invention seeks to eliminate or reduce problems attendant to such types of manufacturing techniques.

SUMMARY OF THE PRESENT INVENTION

Our present invention provides apparatus and methods for the manufacture of tubular containers in which (1) an end closure member is supplied to and carried on a mandrel, (2) a flat sheet of body material is fed to the mandrel and folded into tubular form about a portion of the end closure member, and then (3) heat seal seams are made to seam the folded sheet of body material into a tube and join the body material to the end closure member. The concepts of our invention enable the manufacture of tubular containers employing flexible package material and a pre-formed end closure member in which there is no requirement for registration of a tube with an end closure member either by registering the tube relative to a stationary end closure member or by registering an end closure member relative to a stationary tube. This advantageous aspect is useful in reducing or eliminating registration problems in the construction and operation of machines for manufacturing the tubular containers, and may be incorporated in automatic production machinery suitable for rapid manufacture of the containers.

The machines of this invention may also incorporate suitable heated means for thermally reflowing a portion of the end closure member in order to accommodate manufacture of those types of tubular containers made from an end closure member including a flange which has a radially-extending initial condition and is of a plastic material to enable thermal flowing to a final condition in which it overlies the wall of the tubular body and is arranged in an axial position relative to the tubular body. Containers of this type are illustrated in our copending application entitled "Toothpaste Tubes and Similar Tubular Containers and Methods for Their Manufacture," Ser. No. 211,903, filed Dec. 27, 1971.

Included among the main objects of this invention are: the provision of new and efficacious apparatus and methods for the manufacture of tubular containers of the type herein described; the provision of apparatus suitable for manufacturing tubular containers by folding a sheet of material into tubular form about an end closure member carried on a mandrel; the provision of apparatus including heat seal means for seaming a folded sheet of material into a tube and effecting joinder between the tube and an end closure member; and the inclusion in apparatus and methods as aforesaid of provision for thermal reformation of a portion of the end closure member when the closure member is constructed to be adapted for such processing. A more specific object is to provide the particular details of methods and apparatus hereinafter claimed.

DESCRIPTION OF THE DRAWINGS

The ensuing description is made with reference to the accompanying drawings which form a part hereof and illustrate several specific illustrative embodiments of this invention, in which:

FIG. 2 is an exploded view showing an end closure member which can be used in the practice of this invention;

FIGS. 3, 4 and 5 are cross-sectional views illustrating three types of longitudinal seams that can be used to make the tubular bodies in the practice of this invention;

FIG. 7 is a top view of the apparatus shown in FIG. 6;

FIGS. 9–12 are side views, with portions broken away, along successive section lines located, respectively, at the 12 o'clock, 11 o'clock, 7 o'clock and 3 o'clock positions of FIG. 8 as indicated by their respective section lines shown in FIG. 8.

DESCRIPTION OF PREFERRED EMBODIMENTS

FIGS. 1–5

Figure 1:
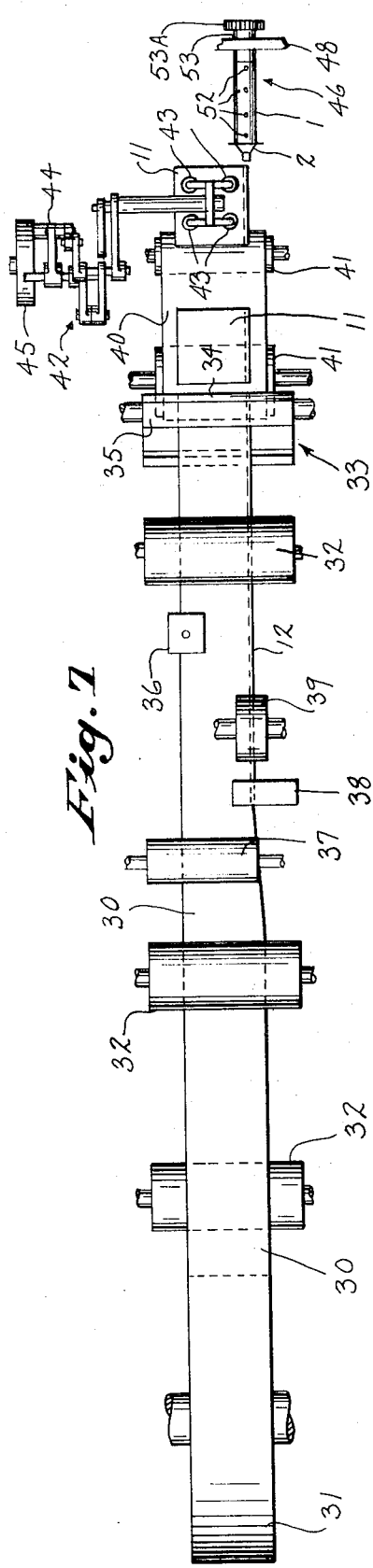
FIG. 1 is a schematic view illustrating the method of this invention and some associated machine elements.

The method of the present invention is illustrated schematically in FIG. 1 which shows the sequence of events that take place with reference to a forming mandrel 1, which may comprise a fixed or revolving tube shaped member.

In Step I, a hollow end closure member 2 is placed on the end of the mandrel 1, in the position indicated. The end closure member 2 may have various configurations, one form of which is indicated in the exploded view of FIG. 2 as comprising an end closure member of the type described in our aforesaid co-pending application Ser. No. 211,903, entitled "Toothpaste Tubes and Similar Tubular Containers and Methods for Their Manufacture," which inclures a main body portion 4, a nozzle 5 extending from one side of the main body portion, an annular skirt 6 extending from the opposite side thereof, and a radially-extending flange 7 projecting from the junction of the skirt 6 and the main body portion of the end closure member. A cap 8 is threaded onto the nozzle 5 to close the open end thereof. The end closure member is made of a plastic material such as polyethylene, nylon, etc., and an insert 9 such as of urea or other plastic material may be arranged inside of the closure member if additional barrier protection is needed for the closure member structure. The cap may be threaded onto the nozzle when the closure member is placed on the mandrel 1 and the mandrel is adapted to retain the end closure member in position throughout the succeeding operations. The end closure member should be of a material which is heat sealable to the material used for the body of the container, or either the annular skirt 6 or flange 7 should be of a material possessing such heat sealable characteristics.

In Step II, a sheet 11 of flexible packaging material is supplied to the mandrel 1. The sheet 11 may comprise a single layer monofilm or a multiple layer film construction incorporating several similar or dissimilar layers or coatings adhered together to form a composite film in which each layer or coating contributes particular functional characteristics. If the tube is to be used for packaging toothpaste, for example, the sheet 11 may incorporate barrier protection in the form of a layer of aluminum foil; the foil layer, in turn, may have a heat sealable layer such as of polyethylene on one or both of its surfaces to impart heat sealability, a paper layer added to the exterior surface to form a readily printable layer, and a transparent coating may be applied as the outermost layer for protection of the decorative printing. If no barrier protection is required for the contents to be packaged within the tube, the sheet 11 may comprise a single layer of polyethylene, polypropylene, nylon, or other material selected in accordance with the specific packaging requirements. The sheet 11 as shown in FIG. 1 has a longitudinal fold line 12 formed near a longitudinal edge portion 13, with the edge portion 13 folded into the position shown in Step II to be utilized to form a longitudinal seam as shown in FIG. 3 wherein the outer surface of the edge portion 13 is joined to the inner surface of the opposite longitudinal edge portion 14 of the sheet of material, and the completed seam is arranged on the outside of the tubular body. Turning to FIG. 4, the edge portion 13 can be folded in the opposite direction and heat sealed to the exterior surface of the opposite edge 14 of the sheet to provide a longitudinal seam that is disposed along the interior of the tubular body. Another seam that can be utilized is the lap seam shown in FIG. 5, wherein the fold line 12 is not formed near an edge of the sheet of material but, instead, the drel as in Step II and the outer surface of the longitudinal edge portion 13 is heat sealed to the inner surface of the opposite edge portion 14 of the sheet.

In Step III, the sheet 11 of material is folded into tubular form about the mandrel with one of its end wall portions surrounding the annular skirt 6 of the end closure member, with its end arranged against or close to the underside of the radially-extending flange 7 of the closure member. The folding of the sheet of material into the tube shape can be accomplished by rotating the mandrel 1, or by associating a suitable folding mechanism with the mandrel.

In Step IV, a longitudinal seam is formed between the opposed longitudinal edge portions 13 and 14 of the sheet 11 of material by applying a heat seal bar 15 against the contacting longitudinal edge portions. The bar 15 is heated to a temperature suitable for effectuating the heat seal and is applied against the edge portions with sufficient pressure for a suitable dwell time to complete the seal in accordance with the characteristics of the specific material employed for the sheet 11.

In Step V, a pair of opposed heat seal jaws 16, each having an arcuate sealing surface 18, are brought into position to form an annular heat seal seam between the end wall portion of one end of the tubular body and the annular skirt 6 of the closure member. The heat seal jaws 16 are actuated under suitable conditions of temperature, pressures and dwell time as will be required to form a heat seal with the specific materials employed for the sheet 11 and the closure member 2.

In Step VI, a heated die 20 having a central opening 21 surrounded by a heated sloping shoulder portion 22 is moved into position to bear against the radially-extending flange 7 of the end closure member, the cap 8 being disposed within the opening 21, and thereby cause the flange 7 to be softened by heat and reflowed to its final condition wherein it is arranged axially of the container body to overlie the exterior of the end wall portion of the tubular body surrounding the annular skirt 6 of the cloesure member, as shown in the completed tubular container 23. If the structure of the end closure member 2 does not include a radially-extending flange 7 which is to be reflowed in the foregoing manner. Step VI of the process can be omitted, and the container structure will be completed at Step V.

FIGS. 6–12

Figure 6:
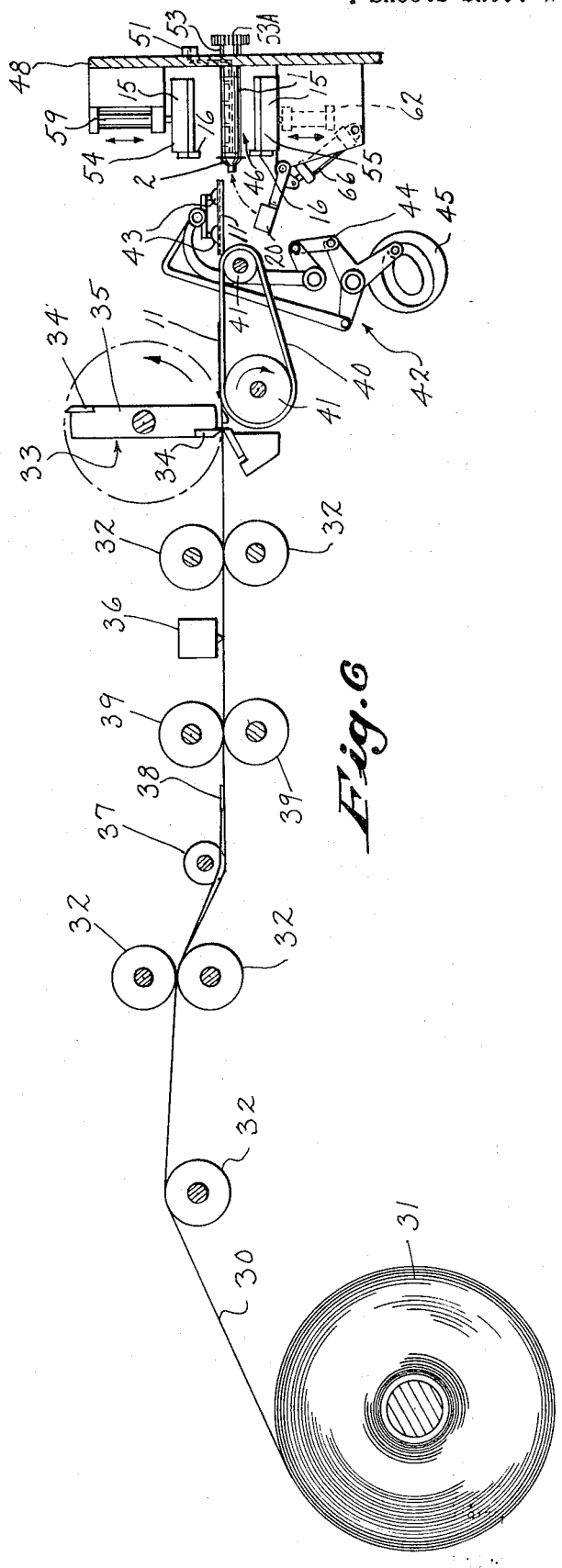
FIG. 6 is a side schematic view of an apparatus according to this invention.

A machine for manufacture of collapsible containers according to this invention is shown in FIGS. 6–12. Referring first to FIGS. 6 and 7, a web 30 of flexible packaging material is unwound from a supply roll 31 thereof and advanced under controlled tension through a series of feed rollers 32. The packaging material is fed through a cutter mechanism 33 which includes a pair of knives 34 attached to and rotated by a double-ended arm 35. A cutoff registration eye 36 responds to variations in the light reflected from the top surface, or print side, of the packaging film to control the cutter mechanism 30 and thereby sever the web of packaging material into sheets 11 of the appropriate size.

Prior to the cutting process, however, a longitudinal fold line 12 is made in the packaging material, when such is used for making the longitudinal seam as discussed above with reference to FIG. 1, the fold line being shown best in FIG. 7. A fold roll 37 is disposed above the packaging material at a point between the two sets of feed rollers 32. The fold roll 37 applies a downward pressure on a substantial portion of the web 30 passing beneath it, thus keeping this portion under tension; the remaining portion of the packaging material, however, is lifted upward by the tension and then folded over a fold bar 38 disposed along one side and bearing downward on the web of packaging material as it leaves the fold roll 37. A pair of heated backseam rollers 39 bear on opposing sides of the fold 12 to make a creased or permanent fold line.

The folded sheets 11 are deposited on a transfer belt 40 which is wrapped around and driven by a pair of rollers 41. The sheets 11 are picked off the transfer belt 40 by a transfer mechanism 42, which is shown as including a set of four fingers 43 containing passages connected to a vacuum generation source (not shown in the drawings). The fingers 43 are positioned by means which include linkages 44 and a cam 45 to cyclically pick up each sheet 11 from the transfer belt 40 and carry it to a mandrel 1 carrying an end closure member 2 which has been positioned in a web loading station 46 by a mechanism now to be described.

Figure 8:
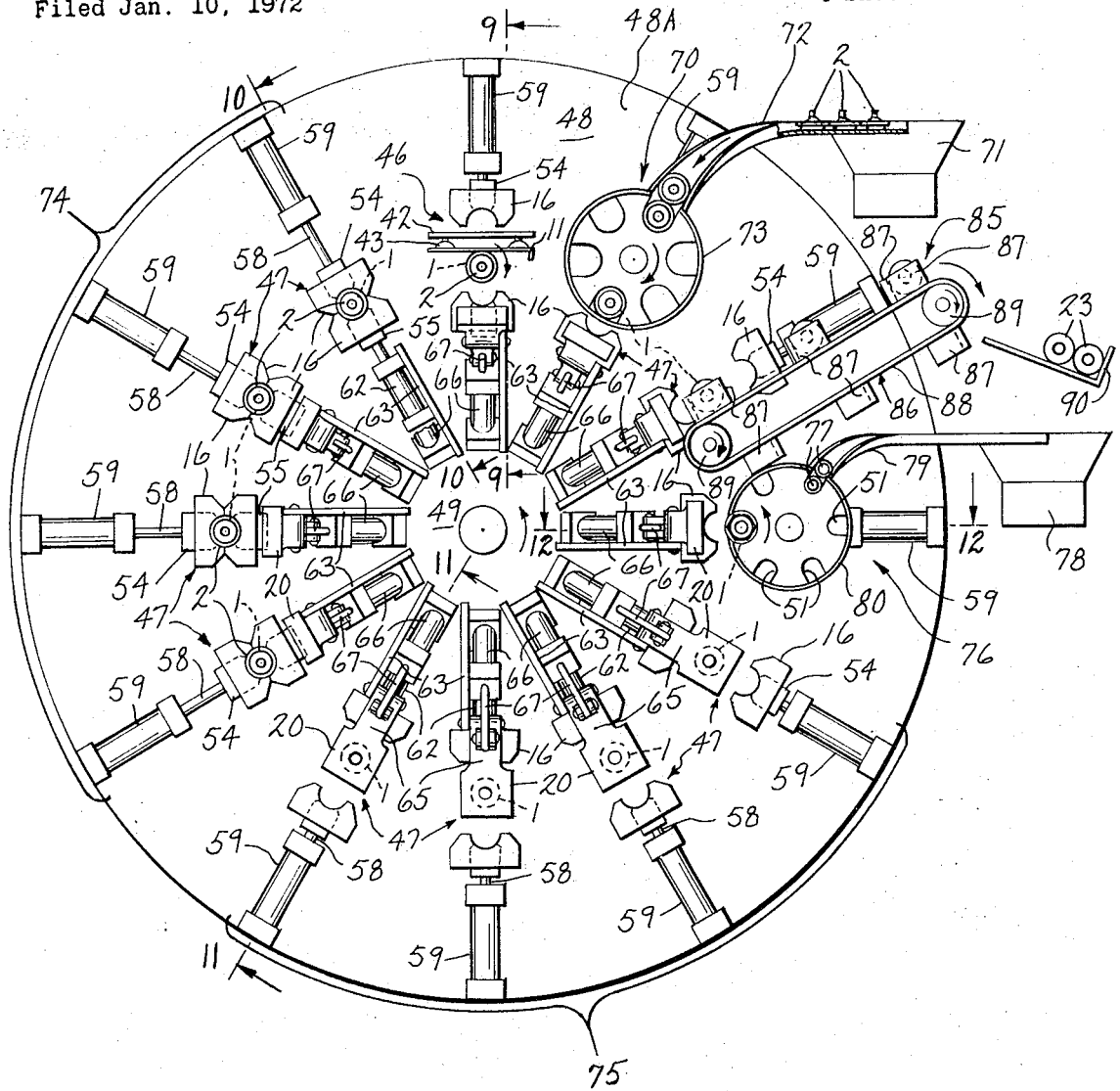
FIG. 8 is a front view, with portions broken away, of part of the apparatus shown in FIG. 6.

Referring to FIG. 8, there are twelve mandrels 1 in the illustrated collapsible container forming machine, each mandrel 1 forming part of a tube forming means 47. The load station 46 is one of six possible stations that can be occupied by each of the twelve tube-forming means 47 that are attached to a circular rotatable platform 48 that moves them from station to station. The tube-forming means 47 are disposed around and extend radially outward from a central hub 49 of the platform 48. Each means 47 operates to perform various tube forming functions as it is rotated about the hub 49 from station to station.

Turning now to FIG. 9, the mandrel 1 of each tube forming means 47 is fastened to and extends perpendicularly outward from a front face 48A of the platform 48. Each mandrel 1 contains internal passages 50 which extend from its front to back and through the platform 48 to a vacuum opening 51 on the back face of the platform. The passages 50 terminate in a plurality of mandrel openings 52 distributed in a line along the length of the mandrel 1, with at least one such opening 56 located at the end of the mandrel to hold the end closure member 2 on the mandrel in the position as shown in FIG. 9. When a vacuum is applied to the vacuum opening 51, a sheet 11 of flexible packaging material held immediately above a mandrel 1 by the transfer mechanism 40 is drawn to and held against the mandrel. Each mandrel is rotatably connected to the platform 48 by means of a shaft 53 which extends through the platform and carries a drive gear 53A. As shown best in FIGS. 8 and 9, while the folded edge of the sheet 11 is retained on the mandrel by suction applied through mandrel openings 52, the mandrel is rotated slowly by means of a motor (not shown in the drawings) connected to the drive gears 53A. A sheet 11 is thereby released from the transfer mechanism 40 and wrapped around a mandrel into a tube.

Located on opposing sides of each mandrel 1 are upper and lower sealing members 54 and 55. Each sealing member 54 and 55 includes a longitudinal heat seal bar 15 and a heat sealing jaw 16. The upper sealing bar 54 is connected to the rod 58 of an air cylinder 59, and the air cylinder 59 in turn is attached by means of an upper plate 60 to the front face 48A of the platform 48. The cylinder 59 is oriented such that when its rod 58 is extended, the sealing bar 54 moves radially inward toward the hub 49 and into contact with the mandrel 1. As shown best in FIG. 10, when thus extended, each longitudinal heat seal bar 15 contacts the tube along its entire length and each sealing jaw 16 wraps half way around the tube along the annular skirt 6 of the closure member. Heating coils (not shown in the drawings) contained within the longitudinal heat seal bar 15 and sealing jaw 16 of the upper sealing member 54 are then energized to heat seal the edges of the sheet together to form the longitudinal seam of the tubular body. The lower sealing member 55 is connected to the rod 61 of a second air cylinder 62. The second air cylinder 62 is connected to the platform 48 by means of a lower plate 63 and is oriented to translate the lower sealing member 55 radially outward, away from the hub 49, when its rod 61 is extended. Unlike the upper sealing member 54, the lower sealing member 55 does not contain a heating coil in its longitudinal heat seal bar 15. Its sealing jaw 16 does have heating coils however, and when the rod 61 is extended, the lower sealing jaw 16 is brought into contact with the tube to form one-half of the top seal around the annular skirt 6 of the end closure member 2. This completes joinder of the tubular body to the end closure member to form the composite container.

Each tube forming means 47 also includes a reforming apparatus 64, which includes a die 20 that is integral with an arm 65 which in turn is pivotally attached to the lower plate 63. The location of its pivot point and the length of the arm 65 are such that the die 20 can be swung from a rest position as shown in FIGS. 8, 9 and 12, to a reforming position around the closure member 2 as shown in FIG. 11. Motion is accomplished by a third air cylinder 66 which has a rod 67 that is attached to an ear 68 on the arm 65. The blind end 69 of the air cylinder 66 is pivotally attached to the lower plate 63.

The sequence of operation of the apparatus will now be described, referring first to FIG. 8. The twelve tube forming mechanisms 47 rotate at a uniform speed about the hub 49 in a counterclockwise direction. As they rotate, cams (not shown) located on the back side of the platform 48 operate to energize the associated air cylinders, loading and unloading devices, heating elements, etc., described above to construct the tubular container during one revolution. The construction process starts at an end closure member loading station 70. Closure mmebers 2 are stored in a hopper 71 from which they are fed by gravity through a chute 72 into one of six compartments spaced around the circumference of a loading wheel 73. Each time a tube forming mechanism 47 moves into the loading station 70, the loading wheel 73 indexes in the clockwise direction to axially align an end closure member 2 contained in one of its compartments with the mandrel 1. The loading wheel 73 is then translated axially toward the platform 48 to slip the end closure member 2 over the end of the mandrel 1. The loading wheel 73 thereafter retracts, and awaits the arrival of the next tube forming mechanism 47.

The tube forming mechanism 47 passes through the web loading station 46 where, as described above, a sheet 11 of flexible packaging material is transferred to and then wrapped around the mandrel 1 and annular skirt 6 of the end closure member 2. It next proceeds through a heat seal station 74, which at any one time is occupied by four tube forming mechanisms 47. At this station, the upper and lower sealing bars 54 and 55 are closed against the mandrel 1 and heat is applied to make the longitudinal heat seal seam and annular heat seal seam. The heat seals are made successively, that is, the longitudinal seam is made first by energizing a coil in the upper longitudinal heat seal bar 15, followed with the top seal made by energizing the coils in the sealing jaws 16. The rate of rotation of the platform 48 is such that an adequate dwell time is provided to form strong seals.

Heat sealing is followed by reforming which is performed as the mechanisms 47 advance through a reforming station 75. Reforming station 75 is also occupied by four tube forming mechanisms 47 at any one time. As shown best in FIGS. 8 and 11, at this station the die 20 is swung down into its reforming position and its coil is energized to heat and reform the flange 7 of the end closure member 2. Again, adequate dwell time is provided by adjusting the rate of rotation of the platform 48.

Finally, the construction of the tubular container is completed at a cap station 76. As shown best in FIGS. 8 and 12, a supply of caps 77 is contained in a hopper 78 which is connected by means of a chute 79 to a cap loading wheel 80. The loading wheel 80 contains six compartments 81 disposed around its circumference, each of which receives and holds a cap 77 when indexed into alignment with the chute 79. The loading wheel 80 indexes each time a tube forming mechanism 47 moves into the cap station 76. A compartment 81 containing a cap 77 is thereby aligned with the mandrel 1 and the closure member 2 contained thereon. A spindle 82 (see FIG. 12) formed on the end of a rod 83 is translated into the aligned compartment 81 by an air cylinder 84, the central axis of which is parallel to and in alignment with the central axis of the mandrel 1. The cap 77 is then grasped by the spindle 82 and carried to a nozzle 5 at which point, the mandrel 1 is rotated by means of the drive gear 53A to fasten the cap 77. The spindle 82 is then withdrawn and the tube forming mechanism 47 moves to the next station.

Turning back now to FIG. 8, after the cap 77 is applied, the finished container is removed from the tube forming mechanism 47 at an unload station 85. The unload station 85 includes a conveyor 86 having six buckets 87 attached along the length of a flexible belt 88. The belt 88 wraps around and is driven by a pair of sprockets 89 to translate the buckets 87 from a pick-up point substantially in alignment with the mandrel 1 of the tube forming mechanism 47, to a drop-off point located radially outward therefrom, beyond the perimeter of the platform 85. The finished containers 23 are ejected from the mandrel 1 by air pressure applied through the vacuum opening 51 on the back side of the platform 47. The ejected container 23 is caught by an awaiting bucket 87 on the conveyor 86 and transferred to the drop-off point where the container falls into a storage bin 90.

It is to be understood that those skilled in the art may devise changes to the specific embodiments of method and apparatus described hereinabove which will remain within the scope of the present invention. For example, as to the method, the step of heating a portion of the end closure member to soften it and cause it to reflow to a position overlying the exterior of the end portion of the tubular body surrounding the closure member can be omitted where the closure member is of a structure which does not include a thermally reflowable structural element adapted for such repositioning. As to the apparatus, the cap supply station 76 and its associated apparatus mechanical elements can be eliminated if the end closure members 2 are supplied with the caps already threaded onto the nozzle. Mandrels 1 may be adapted to retain an end closure member thereon and adapted for folding a flat sheet of material into tubular form by means other than the internal passageways and suction supply system specifically illustrated. The air cylinders shown above for use in reciprocating heat sealing members 54 and 55 and the heated reforming die 20 into and out of engagement with the tubular container being formed on the mandrel can be replaced with mechanical, hydraulic or electrically operating elements. Thus the principal feature of methods and apparatus according to this invention is the concept of first supporting an end closure member on a tubular body forming member, supplying a flat sheet of material onto the forming member, and thereafter folding the sheet of material into the tubular body; related features include the provision of suitable means and processing steps particularly adapted to carry out the manufacture of tubular containers in accordance with this general feature of the present invention.

We claim:

1. Apparatus for the manufacture of tubular containers having a tubular body of flexible heat sealable packaging material joined to an end closure member comprising, in combination:
   (1) end closure supply means adapted to supply a pre-formed end closure onto a mandrel;
   (2) sheet supply means for supplying a flat sheet of flexible packaging material to the mandrel;
   (3) the mandrel adapted to first receive a pre-formed end closure member from the end closure supply means, and thence receive a flat sheet of flexible packaging material from the sheet supply means;
   (4) the mandrel further being adapted to fold the sheet into a tubular form thereabout with an end portion of the sheet surrounding a portion of the end closure member; and
   (5) heat seal means for forming a heat seal longitudinal seam along the tubular body and a heat seal annular seam between the end closure member and the end portion of the tubular body surrounding the closure member, said heat seal means being adapted for actuation subsequent to folding of the sheet into tubular form.

2. Apparatus according to claim 1 further including: means for heating a portion of the end closure member and causing said portion to reflow about exterior of the end portion of the sheet surrounding the end closure member.

3. Apparatus for the manufacture of tubular containers having a tubular body of flexible heat sealable packaging material joined to an end closure member comprising, in combination:
   (1) a mandrel,
   (2) means for supplying a pre-formed end closure member onto an end of the mandrel,
   the mandrel being adapted to retain the end closure member thereon,
   (3) sheet supply means adapted to advance a flat sheet of flexible heat sealable packaging material to the mandrel and arranged to advance said sheet after the means for supplying an end closure member bar has supplied a closure member to the mandrel,
   (4) means for folding the said sheet into a tubular body about the mandrel with an end portion of the tubular body surrounding a portion of the end closure member, and
   (5) heat seal means adapted to form a longitudinal seam along the tubular body and heat seal means adapted to seal the said end portion of the tubular body to the end closure member.

4. Apparatus for the manufacture of tubular containers having a tubular body of flexible heat sealable packaging material joined to an end closure member comprising, in combination:
   (1) a rotatable platform;
   (2) at least one mandrel mounted on the platform;
   (3) means for supplying an end closure member onto the mandrel;
   (4) means for supplying a sheet of flexible packaging material onto the mandrel with a portion thereof overlapping part of an end closure member positioned on the mandrel;
   (5) the mandrel being rotatable to fold said sheet into a tubular body thereabout with an end portion surrounding part of the end closure member; and
   (6) a tube forming means mounted on the platform and including first heat seal means adapted to form a longitudinal seam along the tubular body, and second heat seal means adapted to form an annular seam between the tubular body and the end closure member.

5. Apparatus according to claim 4, wherein: the mandrel includes internal passageways and surface perforations adapted for connection to a vacuum air source for retention of an end closure member and flat sheet of flexible packaging material thereon.

6. Apparatus according to claim 4, wherein: the first and second heat seal means of the tube forming means are each adapted to be reciprocated into and out of engagement with the tubular body and to be heated when in engagement therewith.

7. Apparatus according to claim 4, further including: die means associated with the tube forming means and adapted to engage a portion of the end closure means, heat said portion, and cause it to soften and reflow to a position in which it overlies the exterior of the tubular body end portion surrounding the end closure member.

8. Apparatus according to claim 4 wherein: the means for supplying a flat sheet of packaging material into the mandrel includes means for advancing a web of flexible packaging material through, folding means adapted to fold a longitudinal edge of the advancing web, severing means adapted to cut a sheet of material from the web, and transfer means arranged to transport the cut sheet onto the mandrel.

9. Apparatus for the manufacture of tubular containers having a tubular body of flexible heat sealable packaging material joined to a pre-formed end closure member comprising, in combination:
  (1) a tube forming member adapted to receive and retain a pre-formed end closure member,
  (2) means to supply a flat sheet of flexible packaging material onto the tube forming member after a pre-formed end closure member is retained on the tube forming member, with the sheet positioned to overlap part of said closure member,
  (3) the tube forming member being adapted to fold the flat sheet into a tube with an end portion surrounding part of the end closure member, and
  (4) heat sealing means for seaming the tube and for sealing the tube to the end closure member.

10. A method for the manufacture of a tubular container having a tubular body of flexible heat sealable packaging material joined to a pre-formed end closure mmeber, comprising the steps of:
  (1) positioning a pre-formed end closure member on a mandrel, the end closure member including an annular skirt,
  (2) supplying a flat sheet of flexible packaging material to the mandrel and then folding the sheet into a tubular body about the mandrel with an end portion of the tubular body surrounding the annular skirt of the end closure member, and
  (3) thereafter heat sealing contacting edge portions of the sheet to form a longitudinal seam along the tubular body and heat sealing the said end portion of the tubular body to the annular skirt of the end closure member.

11. A method for the manufacture of a container consisting of a tube of flexible heat sealable packaging material joined to a pre-formed end closure member, comprising the steps of:
  (1) supplying a pre-formed end closure member onto a tubular body forming member,
  (2) advancing a web of flexible packaging material, folding a first longitudinal edge thereof, and then severing a flat sheet therefrom,
  (3) transferring the flat severed sheet onto the tubular body forming member and then folding the flat sheet into a tube about the tubular forming member with the said folded first longitudinal edge in contact with a second longitudinal edge of the sheet and with an end portion of the sheet surrounding a portion of the pre-formed end closure member, and
  (4) thereafter heat sealing the folded first longitudinal edge to the second longitudinal edge to form a longitudinal seam in the tube, and heat sealing the said end portion of the tube to its adjacent portion of the end closure member.

12. A method for the manufacture of a container having a tube of flexible heat sealable packaging material joined to a pre-formed end closure member, comprising the steps:
  (1) providing a pre-formed end closure member and arranging a flat sheet of flexible packaging material alongside the end closure member with an end portion of the sheet overlapping part of the end closure member,
  (2) and then folding the flat sheet into the form of a tube having an end portion surrounding the said part of the end closure member, and
  (3) thereafter joining together contacting opposed edge portions of the sheet to form a longitudinal seam along the tube and joining the said end portion of the tube to the end closure member.

References Cited
UNITED STATES PATENTS

| | | | |
|---|---|---|---|
| 3,111,063 | 11/1963 | Membrino | 93—8 R |
| 3,313,216 | 4/1967 | Piazze | 93—8 R |
| 2,725,001 | 11/1955 | O'Neil | 93—39.2 |
| 3,057,126 | 10/1962 | Chalmers et al. | 53—24 |

EDWARD G. WHITBY, Primary Examiner

U.S. Cl. X.R.

93—10; 156—202, 218, 256, 264, 443, 449, 583